Figure 1:
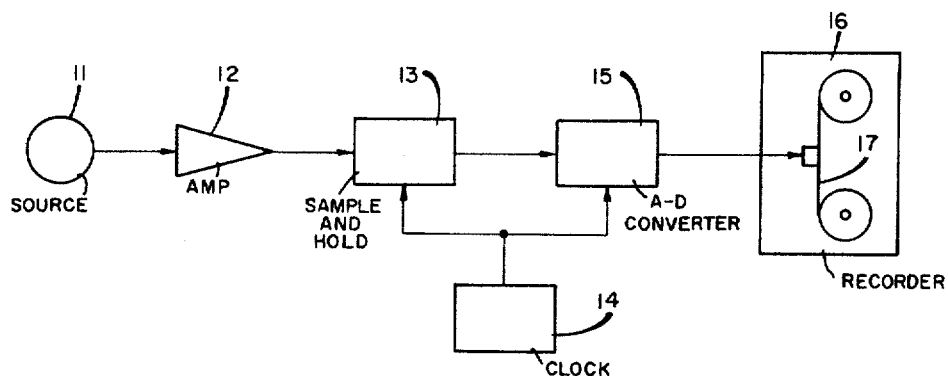

July 25, 1967  C. F. HADLEY ET AL  3,333,247
DIGITAL RECORDING OF SEISMIC DATA
Filed Dec. 16, 1963  6 Sheets-Sheet 2

INVENTORS.
CHARLES F. HADLEY
DANIEL SILVERMAN
BY Paul F. Hawley
ATTORNEY.

July 25, 1967

C. F. HADLEY ETAL 3,333,247

DIGITAL RECORDING OF SEISMIC DATA

Filed Dec. 16, 1963

6 Sheets-Sheet 3

CHARLES F. HADLEY
DANIEL SILVERMAN
INVENTORS.

BY Paul F Hawley

ATTORNEY.

July 25, 1967

C. F. HADLEY ETAL 3,333,247

DIGITAL RECORDING OF SEISMIC DATA

Filed Dec. 16, 1963

6 Sheets-Sheet 4

CHARLES F. HADLEY
DANIEL SILVERMAN
INVENTORS.

BY Paul F Hawley

ATTORNEY.

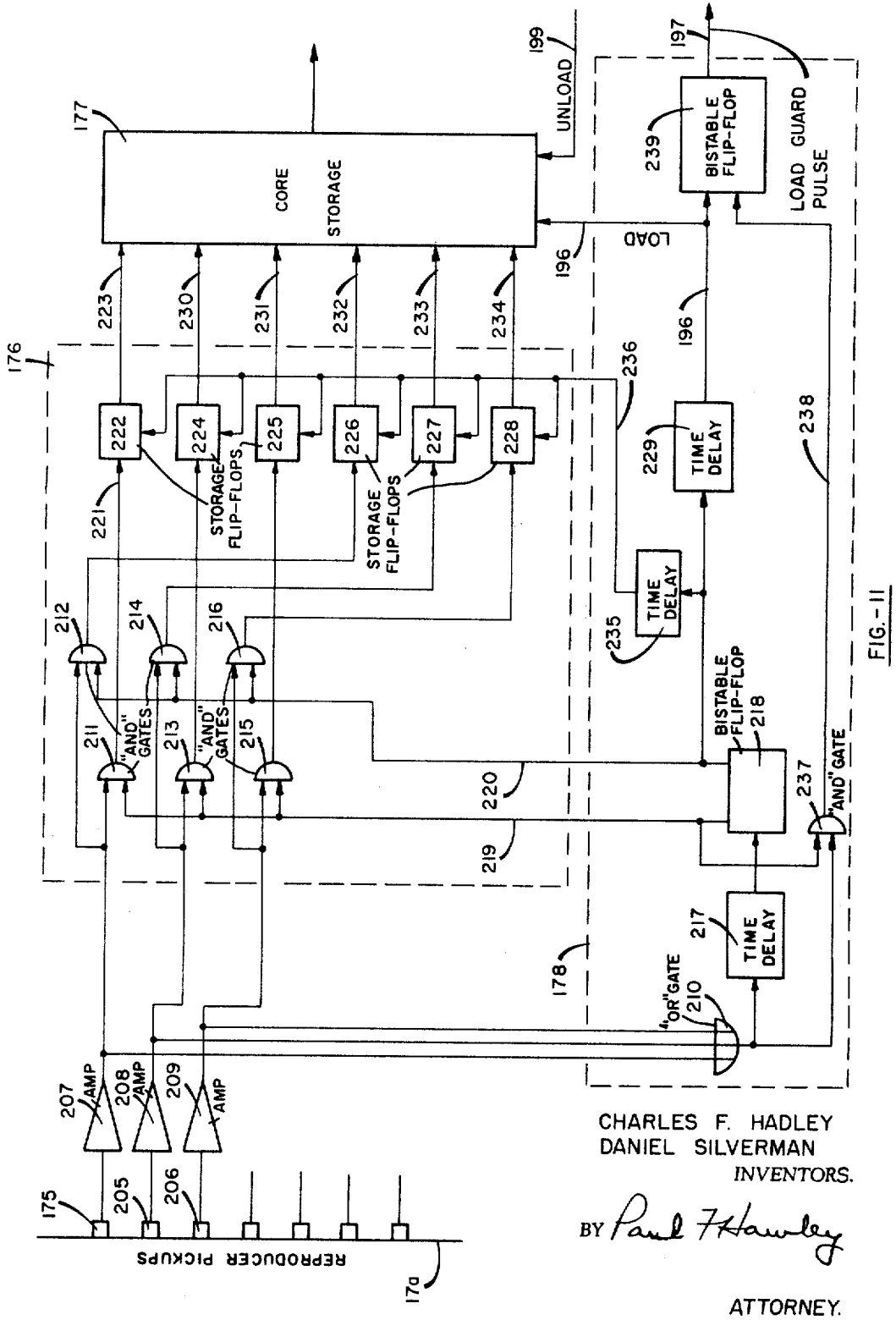

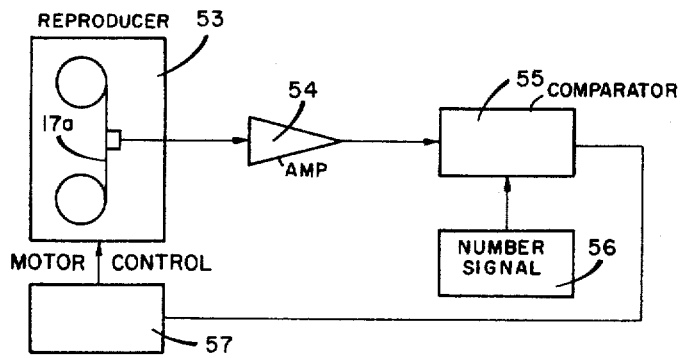
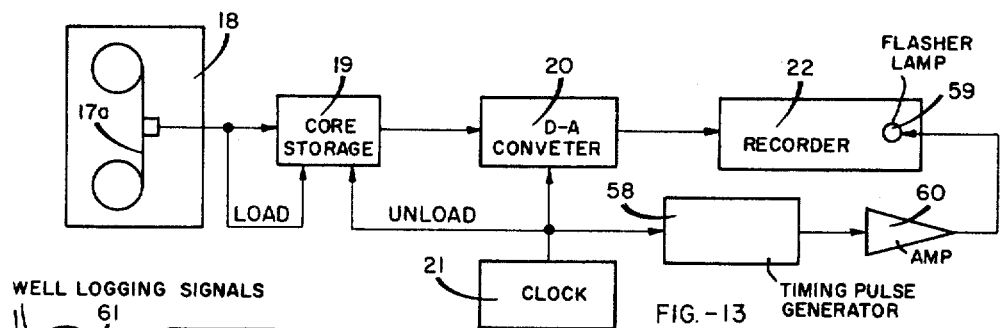
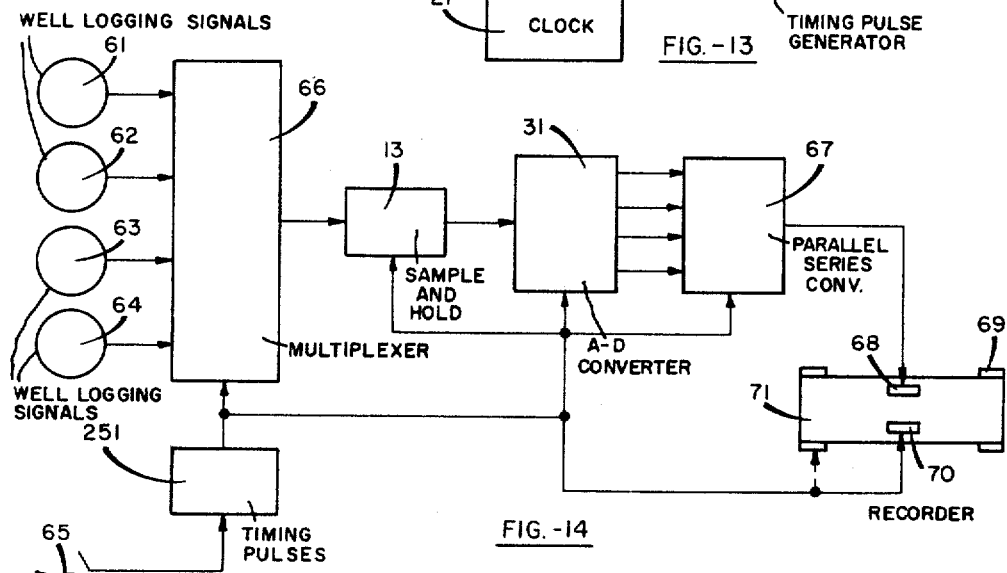
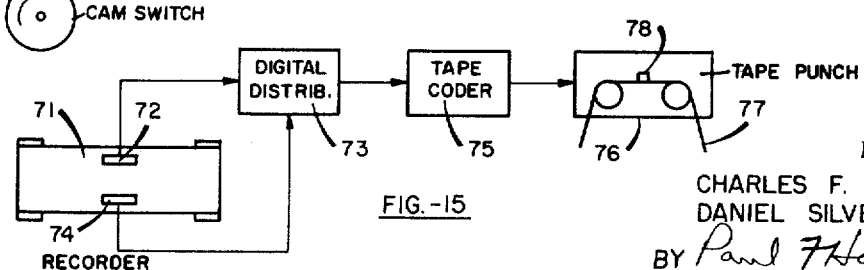

United States Patent Office 3,333,247
Patented July 25, 1967

3,333,247
DIGITAL RECORDING OF SEISMIC DATA
Charles F. Hadley and Daniel Silverman, Tulsa, Okla., assignors to Pan American Petroleum Corporation, Tulsa, Okla., a corporation of Delaware
Filed Dec. 16, 1963, Ser. No. 330,839
8 Claims. (Cl. 340—172.5)

This invention pertains to the field of recording of electrical signals and in particular to the recording and reproduction of such signals in digital form. It has particular application to the geophysical fields of seismic prospecting and well logging, but is not limited to such applications.

It is conventional to generate electric signals in response to some physical phenomenon, amplify such signals, and record them on either transient or permanent recording media such as photographically sensitive paper or film, magnetic recording tape, or the like. Unfortunately such signals are always accompanied by extraneous electric signals (hereinafter referred to as "noise") introduced either in the original measuring operation or in the amplification of the signal, so that the record contains undesirable signal components. Additionally it is frequently desirable to eliminate part of the original signal itself, for example, by filtering. In many situations it is desirable to make a first temporary recording and later transcribe it onto a permanent display, either with or without filtration or other treatment of the signals generated from the temporary recording. Again, it is frequently the case that the amplitude of the signals may at times sufficiently great so that they overload some stage of the amplifier, which produces distortion in the recorded output.

We have found that it is possible to eliminate difficulties of the types outlined above and to secure a quite superior type of recording and reproducing system by the conversion of the original electric signal periodically at a very high rate to an equivalent digital signal, record this digital signal, if desired, perform various operations to improve the signal-to-noise ratio in a digital system, and then convert the digital signal back to an equivalent or analog electric signal for ultimate display. As broadly as outlined immediately above, this has been accomplished already by others, who have provided so-called analog-to-digital converters which can be used to produce periodically with extreme rapidity an output comprising a set or series of digital signals directly proportional to the amplitude of a varying input electric signal, or conversely to produce as output a varying electric signal the amplitude of which is directly proportional to a set of input digital signals. However, when such converters are used to permit the recording of a digitized output proportional to a varying electric signal input, it has been found that the variation in speed which is encountered at the recorder is far too great to permit an ultimate recovery of an analog record with precise timing. Thus, for example, it is found that the ordinary magnetic tape recording system used for recording digital material has a variation in recording speed of a few percent, for example, of the order of 3 to 10 percent, whereas in certain varieties of precise recording, it is necessary to maintain the ultimate output accuracy in time at about 1 part in 1000 to 1 part in 10,000 or more.

We have developed a system which permits producing an equivalent output signal involving a digital-to-analog conversion with a time accuracy of the order of 1 part in 50,000, or better, and an amplitude accuracy of the order of 1 part in 4,000, or better, even though the speed of the tape may vary as much as plus or minus 10 percent. Accordingly, this system makes it possible for the first time to use analog-digital techniques for the recording of such time precision signals as those encountered in seismic prospecting. This system may also be used very advantageously for digital operation on well logs, and, of course, for other equivalent recording.

We have also found that it is possible using this basic system to arrange with excellent system simplicity to record over a dynamic range greatly in excess of the 4,000 to 1 amplitude range already mentioned, but with equivalent precision. Since very frequently in seismic prospecting the total dynamic range exceeds 4,000 to 1, it is apparent that this permits one to use the analog digital system for the precise recording of seismic data or the like without the necessity for using automatic volume controls or other systems which inherently adversely affect the amplitude accuracy of the recording.

Another modification of this basic system which we have developed permits the recording in digital form of a plurality of simultaneous input signals, for example, such as may be obtained from a spread of seismometers during the recording period. Additional modifications which we have made permit one to take a digital tape on which a plurality of records have been recorded, very rapidly obtain a desired record, and separately play it back. We have also found it possible to be able to place timing lines on the output of such a digital recording system in a way permitting a time accuracy again of the order of 1 part in 50,000.

Accordingly, it is an object of this invention to provide a system for digitizing variable electric signals for recording in such a way that amplitude accuracy of the order of 1 part in 4,000 or better, and time sequence accuracy of the order of 1 part in 10,000 or better can be maintained. Another object is to provide a system of this kind including equal accuracy of conversion from digital to analog signals. Another object of this invention is to provide such a system in which variations in amplitudes greater than those that can be handled by the analog-to-digital converter may be successfully recorded. It is a further object of this invention to provide such a system including a search function such that one portion of the recorded digitized material may be rapidly obtained without close review of other parts of the same recording. Other objects and advantages of this invention will become apparent from this specification.

Figure 2:
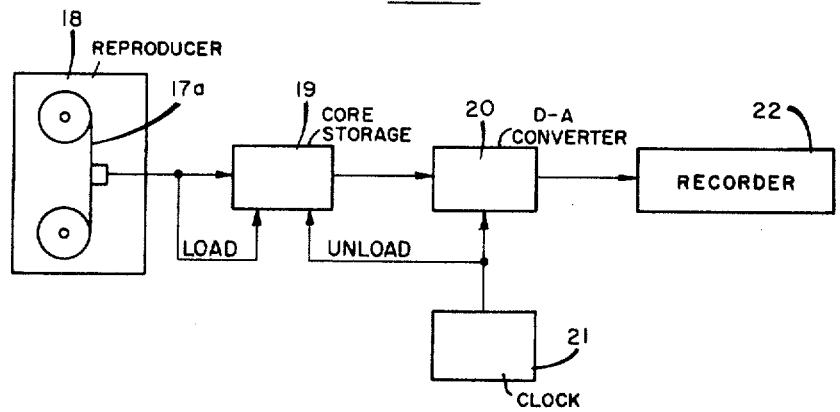
Figure 3:
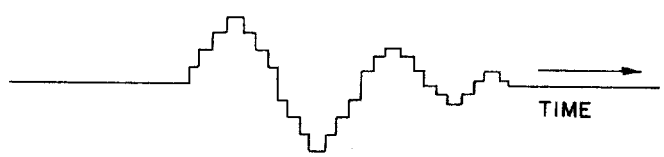
Figure 4:
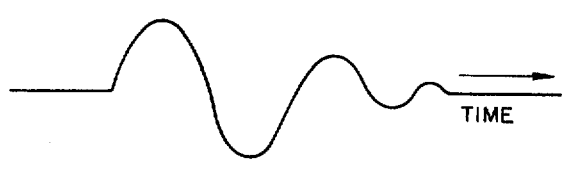
Figure 5:
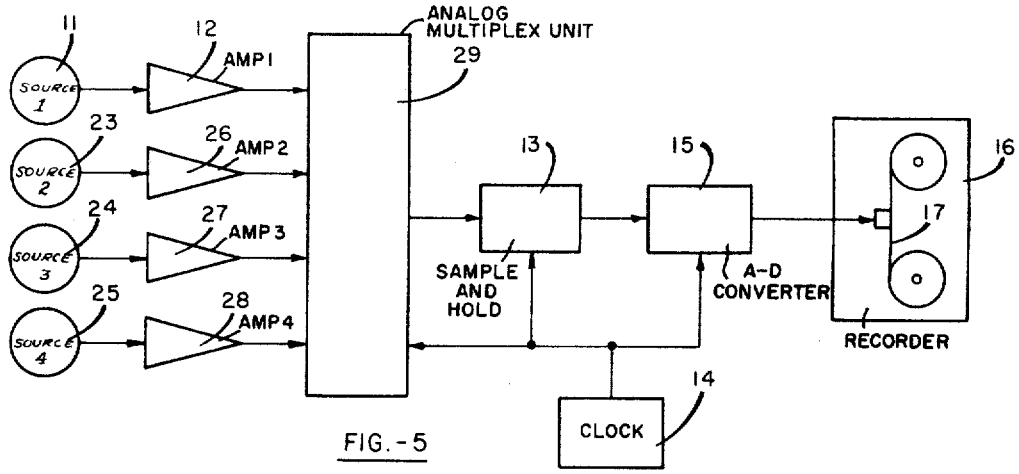
Figure 6:
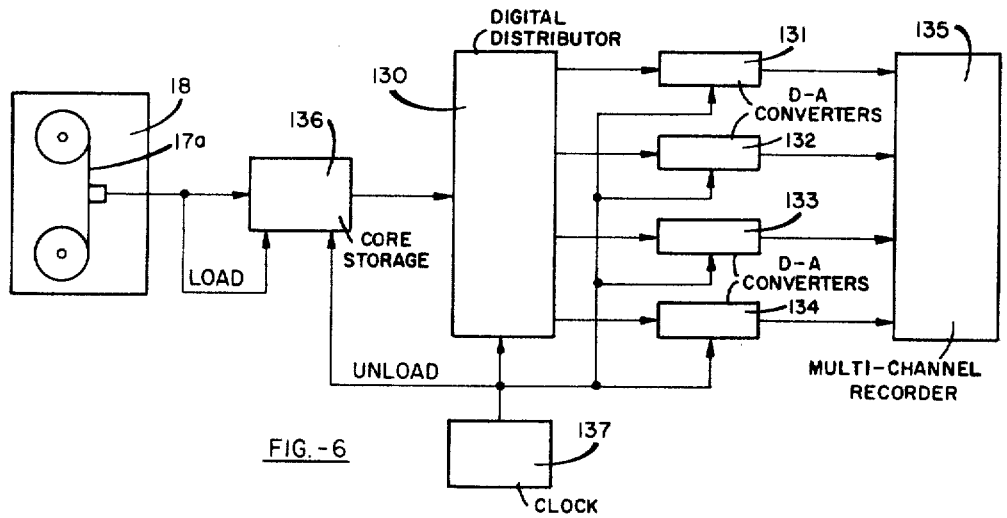
Figure 7:
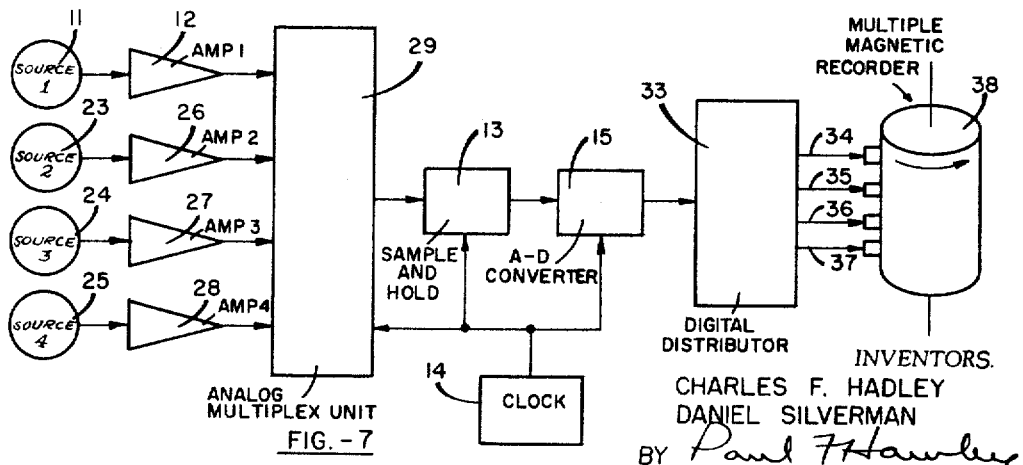
Figure 8:
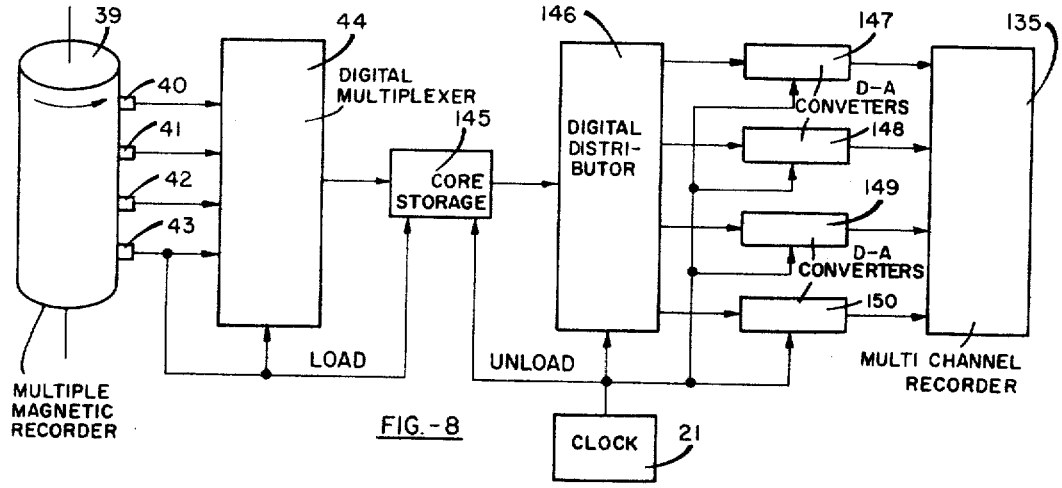
Figure 9:
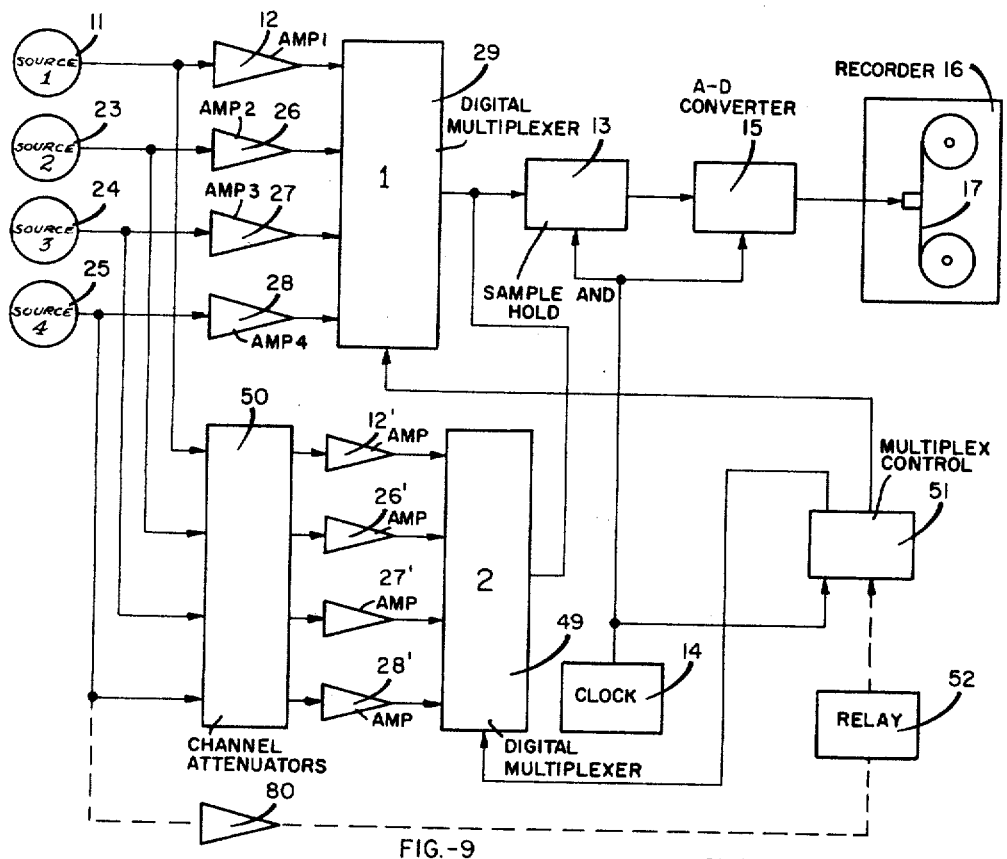
Figure 10:
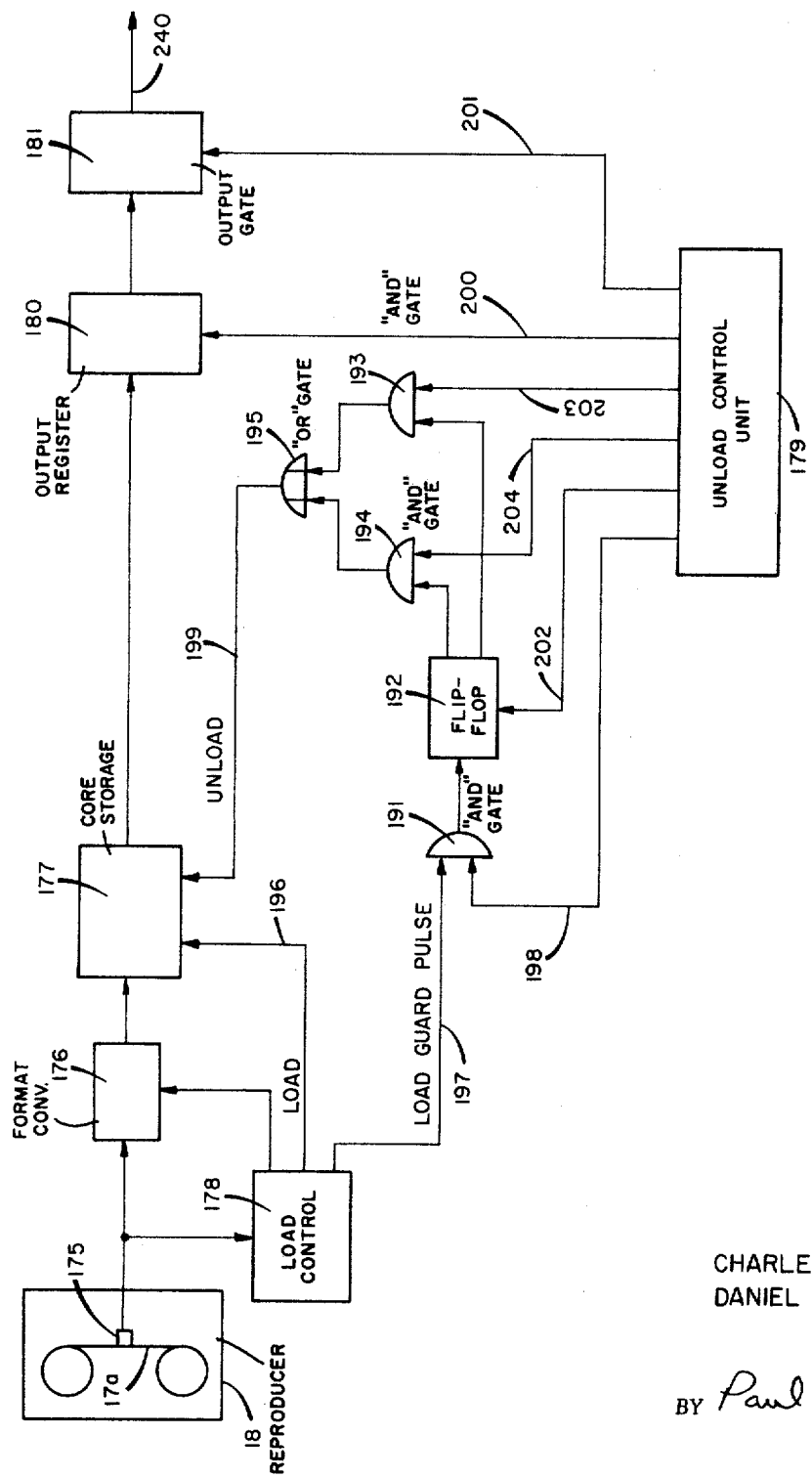

This invention is illustrated by the following drawings:
FIGURES 1 and 2 are a diagrammatic representation of one simple form of our invention;
FIGURES 3 and 4 illustrate two forms of output waves from the system of FIGURES 1 and 2;
FIGURES 5 and 6 illustrate in diagrammatic form a varient in which a plurality of electric signals are recorded substantially simultaneously;
FIGURES 7 and 8 show in block diagram form an alternate to the system shown in FIGURES 5 and 6;
FIGURE 9 is a diagrammatic circuit of another form of the invention suitable for recording of wider ranges in amplitude than the forms previously shown;
FIGURES 10 and 11 show in diagrammatic form the system arrangement for placing digital electric data in core storage in a time sequence involving several percent change in cycle time, while removing such data from storage with great time precision;
FIGURE 12 illustrates a modification of the invention in block diagram form showing an identification and search system permitting one record out of a plurality to be obtained rapidly from a reel, for use in precise recording;
FIGURE 13 shows a diagrammatic representation of a modification of FIGURE 2 in which timing lines are generated and recorded;

FIGURE 14 is a modification of the earlier circuits shown for this invention, as applied to well logging; and FIGURE 15 shows diagrammatically the circuits used for transfer of data from a tape to a computer paper-punched tape, especially adapted for use with the system shown in FIGURE 14.

One of the most simple ways of describing the system is shown in FIGURES 1 and 2 in diagrammatic form. In FIGURE 1 a generator or source of variable electric signals 11 is shown actuating a fixed gain amplifier 12. The output of this amplifier is fed continuously (on a time basis) into the sample and hold circuit 13. (For such circuits see, for example, pp. 5–62 and 5–63 of "Notes on Analog-Digital Conversion Techniques" edited by Alfred K. Susskind, Chapman & Hall, Ltd., London, 1957.) This circuit samples the voltage from the amplifier 12 at regular intervals as specified by the timing control 14, sometimes called a timer or clock. The function of this circuit is to sample the voltage and hold the sample at a constant level while the analog-to-digital converter (hereafter called AD converter) 15 can compute the digital number equal to the voltage held by the sample and hold circuit. The command to start the digitizing process is also obtained from the timing control 14. The AD converter 15, well known in the computer art, has the function of generating an output in digital form directly proportional to the amplitude of the signal impressed on the input to the unit. (Analog-to-digital converters and the reverse are discussed thoroughly in the Susskind book given above.) Ordinarily such converters can also be used as digital-to-analog converters (hereafter called DA converters) as DA conversion is one of the necessary functions in the AD conversion process. Many manufacturers of AD converters make the DA portion available for use. Thus, a series of digitized signals at predetermined, precise intervals of time will be formed in the output of the AD converter 15. These signals are recorded in a reproducible form, for example, on a magnetic tape recorder 16, a magnetic drum recorder, or other means. In the example, recording is on a magnetic tape 17. As mentioned above, there is no requirement that the speed of the recording medium, such as a magnetic tape, need be anywhere near the accuracy of the timing control 14. On the other hand, the timing control 14 must be maintained as accurate as is the desired time accuracy of the over-all recording system. We prefer to use a crystal-controlled oscillator followed by a pulse-shaping circuit which puts out a sharp electrical pulse once every milli-second or once every half millisecond, depending upon the maximum frequency content of the signal from the generator 11. Of course, it is to be understood that higher frequency timing signals can be employed as the maximum frequency component in the input signal increases.

The time control unit 14 provides a precisely controlled series of sharp electrical pulses. One such method is to use a quartz crystal-controlled oscillator followed by a Schmitt trigger circuit to generate a square wave with a fast rise time. These circuits are well known to the art. A typical crystal controlled oscillator is described in "Transistor Electronics" by Arthur W. Lo, Richard O. Endres, Jakob Zawels, Fred D. Waldhauer, and Chung-Chih Cheng, Prentice Hall, 1955, pp. 366–7. The Schmitt trigger is described in "Transistor Circuit Design," book, by engineering staff of Texas Instruments, Incorporated, McGraw-Hill Book Company, 1963.

After the recording has been accomplished, the signal on tape 17 may be modified in one of a large number of ways, none of which in themselves form a part of our invention. For example, in certain so-called data-stacking techniques it is desirable to add the output of a plurality of records. Accordingly, it may be desirable to play back the magnetic tape for the purpose of adding the digits produced to those of other similar records which have been made. Again it may be desirable to impress these digits on the input of a computer for the purpose of correlating the data with some arbitrary wave, or to make some statistical survey, etc. Such correlating can for example take the place of passing the electric signal equivalent to the digits through a wave filter or the like. Such so-called time-domain filtering is described, for example, in the article by Mark K. Smith "A Review of Methods of Filtering Seismic Data," Geophysics, vol. 23, 1958, pp. 44–57.

There seems to be no generic term for both the original series of sets of digital data and the modified series of sets, as described in the last paragraph. For simplicity, in this specification and claims the term "derived digitized material" has been coined for use as such generic term.

Ultimately, an operator wishes to reproduce from derived digitized material a varying amplitude electric signal, a true-time reproduction of the material on a digitized tape 17a. This is to say, since the digits placed on tape 17a correspond to very precise time intervals in sampling the original signal, if not at precise distances along the tape (due to possible tape speed variations) it is desired to produce an analog electric signal the amplitude of which at the same precise intervals of time will be equivalent to the digital values on the tape. Apparatus for accomplishing this is shown in FIGURE 2. Here the digital output generated by the reproducing unit 18 from the digital tape 17a is impressed on the input of core storage 19. This unit has the characteristics of storing and holding the stored values until an electric pulse causes the stored signal to be unloaded. Load command for core storage 19 is obtained from tape signals. The unload signal is supplied by timing control unit 21, which may be identical with unit 14. It is to be understood, therefore, that sequential signals arriving with a possible considerable discrepancy of time, i.e., at nonuniform rates, are temporarily stored in the storage unit 19 and, by virtue of the carefully controlled timing pulse system 21, are released from this storing apparatus with a precision of time equivalent to that present in the original output of the AD converter 15 due to the triggering of unit 14.

The output signals from the core storage 19 pass through the DA converter 20 and thus appear as a stepped electrical wave at the output of this unit, each of these steps being precisely controlled in amplitude in direct accordance with the digital value of the corresponding signal output from the core storage 19. At present, it is possible to obtain commercial converters of this type having an accuracy of approximately 4,000 to 1, that is, the numerical value of the digital signal on the output of the core storage and the amplitude of the corresponding pulse from DA converter 20 agree to one part in 4,000, peak value. Such a stepped wave is shown in FIGURE 3.

Accordingly, it is found that the output of unit 20 is now precise in amplitude to at least one part in 4,000 and precise in time, to the accuracy of the timing pulses from the timing control 21 which will be at least 1 part in 10,000 and ordinarily at least 1 part in 50,000. This output may then be amplified if necessary and impressed on the input of some type of analog recording unit 22, such as a plotter, oscillograph, magnetic drum recorder, or the like. Since the output of the DA converter 20 is in the form of a series of steps of varying amplitude, it is apparent that either the recorder 22 or the amplifier (if one is inserted between units 20 and 22) must inherently possess the characteristic of smoothing the output, so that one records the smoothed value or envelope of the steps leaving unit 20 rather than individual pulses. This is shown in FIGURE 4. A recording galvanometer has such a characteristic. A simple condenser-resistance filter may be used on the output from unit 20, if a different type of recording unit which does not inherently smooth pulse output is used.

It is necessary to prevent simultaneous loading and unloading of the storage 20 at the same time. This is provided for in our system as is subsequently described. The core storage itself is a well-known device, described, for example, in R. K. Richards' "Digital Computer Components and Circuits," D. Van Nostrand Co. (1957), chapter 8.

Another comment which should be given with regard to the system shown in FIGURES 1 and 2 is that the timing control apparatus has several functions. In FIGURE 1 the time control 14 provides commands to operate the sample and hold circuit 13 and the AD converter 15. The time of sampling must be specified from a precise time system. The AD converter must start the conversion after the sampling process has been completed.

In the system described in FIGURE 2, the core storage 19 obtains its load commands from the data from the tape. The unload command to the core storage and the DA converter 20 commands are obtained from the time control 21. This unit also prevents the simultaneous loading and unloading of the core storage 19, described subsequently.

The amount of time that it takes to form the digital signal from the instantaneous amplitude of the incoming analog signal, and to store this in the core storage unit, or the converse process of reading-out the digit from the core storage and producing an equivalent analog pulse is extremely small. This typically, takes of the order of from one to twenty microseconds. As a factor of experience, we have found that it is not necessary to sample an electrical signal at a time rate greater than approximately twice the highest frequency component present. Thus, for example, if the highest frequency component in a signal is in the order of 500 cycles per second, it is not necessary to sample at a rate greater than every thousandth of a second. Accordingly, with seismic data, well logging data and equivalents, it is apparent that in one thousandth of a second, or one thousand microseconds, there is much time during each sampling cycle in which the sampling and storing of data from one individual generator 11 does not occur. This leads, therefore, to the idea of using multiplex operation when there are a plurality of inputs. Thus, in FIGURE 5 we have shown in diagrammatic form a plurality of generators, for example, seismometers 11, 23, 24 and 25, each feeding an amplifier such as 12, 26, 27 and 28, the outputs of all of which go into a multiplexer unit 29. This unit, and the sample and hold circuit 13 and the AD converter 15 are actuated, as before, by the timing control 14 with its very precisely timed sequential output pulses. However, unit 29 works as follows: The input from the multiple input channels, in this case units 12, 26, 27 and 28, are either sampled simultaneously or (more usually) sampled in sequence by multiplexer 29. If the input channels are sampled simultaneously, the analog value of each channel is passed to sample and hold circuit 13 and then to AD converter 15 in sequence. If the multiplexer 29 samples the input channels in sequence, this sequence of analog values each representing the analog value of the input channels in sequence are passed to sample and hold circuit 13 and AD converter 15 as they are sampled. The timing of the multiplexing operation and subsequent sample and hold and AD operations are controlled by time control 14.

Thus, for example, we have found that it is possible to multiplex 25 channels and make the analog-to-digital conversion sequentially during the time between individual samplings, as is described later. Since the AD converter operates in very short time, as discussed above, it is therefore possible to place sequentially on the magnetic tape 17 all of the data from the sampling of all of the various traces in the same time that it would take to do this job for one trace in the equipment shown in FIGURE 1. It is also to be noted that the read-out from unit 29 is invariable in exactly the same sequence. Thus, if the sample from unit 27 is read out 40 microseconds after the pulse being read out from unit 26 during a particular read-out sequence, this 40 microsecond sequence will persist throughout all of the readings from these respective channels.

The analog multiplexer 29 is well known in the art, and is described for example by Martin L. Klein, Frank K. Williams, and Harry C. Morgan in the article, "Multiplexing," Instruments and Automation, vol. 29, March 1956, pp. 470–477.

If a system as shown in FIGURE 5 is employed to sample multiple generating sources and record them in digital form at precisely controlled time intervals on a series sequential magnetic tape 17, then an equivalent system must be used to reproduce the digital signals in analog form on multiple recording channels. This is given in FIGURE 6. The signal, comprising derived digitized material on tape 17a as reproduced by tape reproducer 18, is loaded onto core storage 136. The signals are loaded into storage upon commands derived from the tape 17a. The core storage 136 is sequentially unloaded into digital distributor 130 upon command of control unit 137, equivalent to unit 14. The digital distributor 130 sends signals from one channel (such as from units 11 and 12) to one only of a set of DA converters 131 to 134, and so on. The analog signals are separately recorded by the multichannel recorder 135.

On the other hand, it is not necessary to use the AD converter of the type shown in FIGURE 5, and thus may, in some cases, ease up on the recording requirements for recorder 16. Thus, for example, in FIGURE 7 the same generating, sampling, and holding, and AD conversion facilities are shown as were given in FIGURE 5. However, this system is now shown possessing additionally a distributor 33 such that it not only produces the digital equivalent of the sampled input from the four channels shown but places the signals from each channel on a separate channel 34 to 37 leading to one recorder of a multiple magnetic recorder unit 38. Accordingly, the digital records are made at a greater time span than was possible in the unit shown in FIGURE 5. This time span is, of course, equivalent to the time between output pulses from the timing control unit 14. Such a distributor is clearly described in "Application Note 5.1, Decommutation of Pulse Data," by Engineered Electronics Co., 1441 Chestnut Ave., Santa Ana, Calif.

If apparatus such as shown in FIGURE 7 is used to produce in digital form the output of the various generators 11 to 25, then equivalent equipment should be used, as shown in FIGURE 8, to produce the multiple output in analog form. Thus, for example, the derived digitized material on a magnetic drum in a magnetic reproducing unit 39 (which may be the same as unit 38) can actuate the reproducing heads 40 to 43, which will produce a plurality of channels of digital output equivalent to the original signals from the generators 11 to 25. These are fed into the digital multiplexer 44 which converts the digital data from the four channels into a single multiplexed digital channel. The digital data from the multiplexer 44 is stored in core storage 145 as it comes from the multiplexer. The loading operation of the core storage 145 and multiplexer 44 are operated upon command of signals from the multiple channel digital recorder 39. However, the core storage 145 is unloaded upon command from timing unit 21, into the digital distributor 146, which is also controlled by time unit 21. Each of the digital outputs are fed into a separate DA converter of a set 147 through 150, and the analog equivalent into the recording channels of multiple recorder 135.

It may be found (particularly in the case of digital recording of seismic data) that the total input range of signal amplitude is considerably beyond that which can be handled by the usual AD converter. We have found that this can be handled nicely by modification of the system described thus far. This is shown in FIGURE 9 in diagrammatic form. Here the output of the amplifiers 12 and 26 to 28 is impressed on a multiplexer 29. A second equivalent unit 49 is provided with its own amplifiers 12' and 26' to 28', but the signals in this case have been passed through an attenuator 50. This attenuator simply reduces the amplitude of the input of each channel by a fixed ascertainable amount. This may be the same for all channels or may be arranged for individual channel adjustment, as desired. In the case of high signal amplitude, we use the output of the second multiplexer 49 rather than unit 29. Accordingly, the outputs from units 29 and 49 may be connected together as input to the sample and hold unit 13 and AD converter 15 which feeds recorder 16 as before, there being sampling time control of a precise nature from the timing control 14. However, in this case the timing control additionally actuates a multiplex control 51 which in turn actuates either unit 49 or unit 29. In our preferred arrangement the multiplex control unit 51 initially actuates unit 49 for a predetermined number of pulses from time control unit 14. Thus, for example, it may actuate the multiplexer 49 for an equivalent of 1,000 or 2,000 pulses, as the case may be, after which it switches control during the cycle after completion of all output from 49 and before the initiation of a succeeding timing pulse from unit 14, to unit 29 which thereupon impresses unattenuated samples on the sample and hole unit 13 and AD computer unit 15.

If desired, the multiplex control device 51 may not be time actuated, but may be actuated in an alternative fashion, as shown by the dotted lines in FIGURE 9. In this case the output of a channel in unattenuated form is used as a volume control which will ultimately actuate unit 52. The channel input will usually be amplified through an amplifier 80. Unit 52 is simply a relay which is responsive to the average amplitude of the signals coming in. It puts out a signal at the time when the average input signal to it has decreased to a predetermined value, thus acting in unit 51 to switch control from unit 49 to unit 29. Accordingly, the multiplex control 51 acts either in accordance with a predetermined passage of time or with the decrease in signal amplitude to a predetermined maximum to switch between the output of multiplexer 49 which is being in turn fed an attenuated signal, and a multiplexer 29 which is being fed with an unattenuated signal. The attenuation, of course, is something which can be precisely determined and accordingly we find that it is possible to record in the ultimate recording unit 16 using the system used in FIGURE 9 with accuracy of at least 4,000 to 1 over an amplitude ratio which is some 30 decibels greater than that shown in, for example, FIGURE 5. If desired, a suitable signal can be given to the recorder at the time when the control is shifted from unit 49 to 29 but ordinarily this is unnecessary since there will be a change in amplitude at that particular point.

This method of changing level by choosing one of two (or more) digital signals representing various signal levels is chosen so that the switching can be accomplished *between* analog samples to the AD converters. This will result in no switching transient as usually occurs when level switching is done in analog systems.

This system of multiple level control can be extended to more than two levels if desired.

The system shown in FIGURE 9 provides for switching from one multiplexer unit 49 to a second multiplexer unit 29 after passage of a predetermined time interval or change in average maximum amplitude of the varying amplitude signal from one level to another. The two multiplexers feed into a common sample and hold unit 13 which in turn feeds a common AD converter 15. It is apparent that each multiplexer unit (49 and 29) could feed to an individual sample and hold unit followed by an individual AD converter. The outputs of the AD converter in this case are fed in parallel into the recorder 16. Switching in this case by control unit 51 is on the two AD converters, which conventionally are arranged for rapid off-on from an electric pulse.

It is not possible to load and unload a core storage simultaneously. If the data taken off of the multichannel tape 17a, as shown for example in FIGURE 10, were received at a substantially completely uniform rate, there would be no particular problem in arranging the loading and unloading of the core storage so that interlacing of loading and unloading operations would be achieved without the loss of data. However, it is unduly expensive, if at all possible, to obtain tape drives for the recording units (such as unit 16) and reproducing units (such as unit 18) which are capable of transporting tape at sufficiently accurately controlled speed to permit this type of operation. Accordingly, it was found necessary to develop a circuit which would permit loading a core storage at any time that data were presented and unloading the core storage at precise and fixed intervals of time and without the loss of data. The block diagram for this arrangement is shown in FIGURES 8 and 9.

The data in the form of a set of digits on a multitrack tape 17a is read off by the tape heads of which one head, 175, is shown in FIGURE 10. The data are transmitted in parallel to a format converter 176 and a load control unit 178. The amplitude of an analog signal is converted into sets of two-character "word" forms, each set characterizing the amplitude of the signal at the time sampled. Conventionally, in the apparatus described in these figures the data is presented in two-character, six-bit "word" form. The two consecutive six-bit words form one twelve-bit word which describes the amplitude of the sampled signal. Accordingly, unit 176 must temporarily store the first six-bit word, and pass this information into the core storage unit 177 only when the second six-bit word has been received by unit 176. The load control unit 178 receives a signal each time the tape 17a puts a signal on the read-out heads, such as 175, and in turn puts out three signals, one of which is a signal command to the format converter 176 to pass the two six-bit words into the temporary storage where upon command these can be read out into the core storage 177. Unit 178 also puts out an electrical signal which is a load command to unit 177 to accept the twelve-bit word temporarily stored in the format converter 176. Finally it generates a load guard pulse, the function of which is described below. The timing of the load-command signal on channel 196 is used to command the core storage 177 to load the data presented on the input to the core storage only after a suitable twelve-bit word has been accumulated and is being temporarily stored in unit 176.

An unload control unit 179 is provided to generate the necessary pulses to operate the unloading function of the core storage 177 at extremely precise units of time. This unit corresponds in function to the timing control unit 21 shown in FIGURE 2. Precision in this unt is obtained by using a high accuracy frequency standard, for example, a crystal-controlled oscillator or the like, which is suitably stepped down in frequency by multivibrator circuits as is very well known in the electronic art. All of the unload function pulses are derived by countdown techniques from the precision standard and thus have precise relations to each other.

The control system first compares the timing of the load guard pulse coming from the load control unit 178 on channel 197 with a check load pulse on channel 198. If these two pulses are not coincident, then it is safe to unload one set of digital data from the core storage unit 177, because no data are being loaded at that instant into unit 177 from the format converter 176. On the other hand, if these two pulses on channels 197 and 198 are coincident, there is danger of loading and unloading the core storage unit 177 simultaneously. Accordingly, if these pulses are coincident, the unload operation automatically is delayed to a later time in the operation cycle—after the currently arriving signal from unit 176 has been deposited in core storage 177. The unload command 199 is actuated either early in each operation cycle or late in this cycle, depending upon the status of loading of the core storage. In either case the actuation of the unload signal through channel 199 into core storage 177 causes the data to be read out of the core storage 177 and placed in the output register 180. Here the output signal is stored temporarily, so that it can be removed from storage at precisely the same interval of time each cycle. As soon as the data is stored in output register 180, it is available for use. The data is made available to output channel 240 by actuating output gate 181 by strobe output register pulse 201. After the data has been used from output register 180, the register is cleared ready for the next cycle by output register reset signal on channel 200. This delivers at the same time each cycle a set of output digitized data for input to a DA converter, as shown in FIGURE 2.

In practice, the core storage unit 177 is loaded to approximately one-half its total digital capacity before the unload operation is started. This permits operation of the system without danger that, if the data are presented slowly and read out more rapidly for a short time, the entire core storage unit will be unloaded and there would be only zero signals presented to the output of the system. It must be borne in mind that data must be unloaded before it is used and that data cannot be unloaded before it is stored. Here are the two situations that could produce false records.

The load guard pulse on channel 197 is compared automatically with a periodic timing pulse sent out by channel 198 by means of the "and" circuit gate 191. Such a circuit produces an electric signal output into unit 192 only if there are simultaneous electric pulses on all inputs—in this case, channels 197 and 198. (The description of one such "and" circuit is given in chapter 29 of "Transistor Circuit Design" by Engineering Staff of Texas Instruments, Incorporated, McGraw-Hill Book Co., 1963.) When pulses on channels 197 and 198 coincide, the output through the "and" circuit 191 will initiate action of a coincidence flip-flop unit 192. If the two pulses are not in coincidence, the flip-flop unit 192 will remain in reset condition. Unit 192 is reset at the proper time in the over-all cycle by a pulse on channel 202. Transistor bistable pulse circuits of the flip-flop type are shown in the Texas Instruments' reference given above, on pages 373–377.

The two outputs of the coincidence flip-flop unit 192 are out of phase with each other. In other words, if a signal exists on one output the signal does not exist on the other output and vice versa. One output goes to "and" circuit 194; the other goes to a similar "and" circuit 193. The unload control unit 179 puts out through channel 203 an early- and through channel 204 a late-timed pulse, during each operating cycle. The "and" gates 193 and 194 select either the early pulse on 203 or the late pulse on 204, depending on the condition of the coincidence flip-flop 192. Accordingly, if the coincidence flip-flop unit 192 is still reset, that is, if the load guard pulse on channel 179 is not coincident with the pulse on channel 198, the coincidence flip-flop circuit 192 will remain in reset conditions. The reset output of this unit 192 is fed into one input of the "and" gate 193 and an unloading pulse which occurs early in the cycle (hereafter called early unload pulse) is fed into the other input of this "and" circuit 193. Thus, if the coincidence flip-flop unit 192 is still reset, the early unload pulse generated and placed on channel 203 is passed by gate 193 to the "or" gate 195. An "or" circuit has the property of producing an output when there is an input on any of the circuits connected to it. Such "or" gates are described, for example, in chapter 29 of the Texas Instruments reference given above.

In a similar manner, the other output of the coincidence flip-flop unit 192 and a late unload pulse on channel 204 are fed into an "and" gate 194. Thus, if the coincidence flip-flop unit 192 is set by a coincidence of the load guard pulse on channel 197 and the check load pulse on channel 198, there will be a coincidence of pulses on channels 204 and the second output from unit 192, which will energize the "and" gate 194, and a pulse will be passed to the unload channel 199 late in the operation cycle. From this description it is apparent that once each cycle, either the early unload pulse on channel 203 or the late unload pulse on channel 204 will be connected through an "and" gate 193 or 194 to an "or" gate 195 and hence to the unload channel 199 and the core storage unit 177. Core storage unit 177 will accordingly be unloaded of one set of data either early in the cycle, if the load guard pulse and the pulse on channel 198 are not in coincidence, or late in the cycle if these pulses are coincident. This system provides the logic to prevent simultaneous loading and unloading of the core storage.

Details of units 176 and 178 are given in FIGURE 11. The multichannel tape 17a passes by and immediately adjacent to a plurality of tape heads. Only three such heads (175, 205, and 206) are shown connected into the circuit, for simplicity. It will be readily apparent that the remainder of the tape heads will be connected into identical circuits to those shown in this figure. The output of tape heads 175, 205 and 206 are fed respectively into amplifiers 207, 208 and 209. The output of these amplifiers are all connected to an "or" gate 210. The output of each amplifier is also connected directly to the input of two "and" gates. Thus, for example, amplifier 207 is connected to the inputs of "and" gates 211 and 212, amplifier 208 to the inputs of "and" gates 213 and 214, and amplifier 209 to "and" gates 215 and 216.

The output of the "or" circuit 210 is placed on the input to a monostable multivibrator circuit which is simply a time-delay pulse generator 217. Such circuits are described on pages 380–1 of the Texas Instruments' reference. It, in turn, actuates a bistable flip-flop circuit 218, which accordingly puts a pulse alternately on channels 219 and 220 a fixed interval of time in each cycle after the actuation of unit 217. The time delay of unit 217 is set so that the change of state of the flip-flop 218 will not occur until after the end of the latest pulse from the amplifiers 207, 208 and 209. These pulses should occur nearly simultaneously, but due to mechanical problems which produce skew in the tape as it is read, there may be variations in the timing of these pulses. Assuming that the flip-flop is at the moment in set condition, an output on channel 219 will occur. The signal presented by amplifier 207 will be presented to "and" circuit 211 which is actuated by signal on channel 219 and there will be an output on channel 221 to the storage flip-flop unit 222, thus presenting the storage output from unit 222 to the channel 223 going to a load input on the core storage unit 177. Simultaneously, flip-flop units 224 and 225 may or may not be actuated, depending on whether a signal pulse was present on the input to amplifiers 208 and 209, respectively.

After the pulses on the inputs 200, 205 and 206 are over, the flip-flop unit 218 will be set by circuit 210 and delay unit 217. An energizing pulse will exist on channel 220, actuating gates 212, 214, and 216 passing the outputs (if any) to storage flip-flops 226, 227, and 228, respectively. Accordingly, by the procedure outlined, the two six-bit character adjacent "words" on the tape are now presented as signals on the output of the storage flip-flop units 222 and 224 to 228. Next in each cycle, a load pulse is generated on channel 196 from unit 178. This takes place by taking voltage output from channel 220 and passing it through the monostable multivibrator unit 229 to produce a suitable small time delay after which the output is placed on channel 196. Accordingly, as soon as this signal reaches the core storage 177, the outputs on channels 223 and 230 to 234 are loaded into the core storage unit. Another monostable multivibrator unit 235 after a short time delay, produces an output pulse on channel 236 which clears or resets all of the storage flip-flop units 222 and 224 to 228 in their original condition, ready for the next cycle of operation.

Output voltage from channel 219 is also compared in an "and" unit 237 with the pulse originating on the output of the "or" circuit 210. When these pulses coincide, an output is placed once each operating cycle on channel 238 which goes to one input of a double-input, bistable flip-flop circuit 239. The other input to this unit is the voltage on channel 196. An output from this flip-flop is used as the load guard pulse on channel 197.

It is apparent that when one has recorded a number of channels on a magnetic tape, or the like, it may involve some time in looking through the tape to find the particular channel of a particular series of recordings for reproduction. A reel of computer tape may contain as many as 480 seismic traces. Accordingly, it is desirable to have some means of searching through the tape to find a particular record. In order to be able to accomplish this, the operator routinely records on the recording medium, such as tape 17a, a series of digitized signals which identify, to whatever particularly required, the number of the record. This will subsequently be used to retrieve this particular trace. The trace is then recorded in digital form, as described in connection with FIGURE 1 or its equivalent.

When one wishes to search for this particular trace it is advantageous to use the system which we have devised and shown in FIGURE 12. Here the tape transport mechanism, or reproducer 53, is arranged for two speeds of operation as well as start and stop. The fast speed of operation, preferably approximately 10 to 15 times the ordinary recording or reproducing speed, is used when searching the tape for a particular identification signal. The output of the tape 17a is impressed on an amplifier 54 which feeds one input into a comparator 55. This compares the digital output from the tape against a set of signals which have been generated in an identification number digit switch 56. Accordingly, the comparator unit, after the tape has been started up in high velocity condition by the tape transport control unit 57, compares the various identification signals produced in unit 53 as amplified by amplifier 54 with the identification signal which has been put out by unit 56. At the point where these two sets of signals coincide the comparator for the first time goes into action and produces a single pulse which actuates as a stop command on the tape transport control 57, rapidly stopping the transport of the tape 17 and thus leaving the tape set up ready for producing its digits in accordance with the systems described in FIGURE 2 and the like.

Digital comparators are described in many digital module manuals. See, for example, "Digital Module Application Manual," Packard Bell Computer Corp., Bulletin No. PB4118.

It is frequently necessary to place timing indications on the ultimate analog recording so that a timing of the various events on the variable amplitude trace, or traces, may be made. This calls for a modification of the system we have shown in FIGURE 2, for example. Thus, in FIGURE 13 there has been added to the units shown in FIGURE 2 a timing pulse generator 58 and a flasher lamp or the like 59 mounted within the recorder 22. The function of unit 58 is that of counting down the time pulses produced by time control 21. For example, one may use a flip-flop counter circuit in unit 58 at a 10:1 pulse reduction. Thus, for every 10 timing pulses put out by the timing control 21, one pulse will be put out by the unit 58. This pulse may be suitably amplified through an amplifier 60 and impressed on the flasher lamp 59 to generate a timing line in the oscillographic type recorder 22, or the like. Other equivalent modifications can be made. It is important to realize in any of the uses of this timing marker system that one is still relying basically on the time control unit 21 which is insuring that the analog output from the DA converter 20 is occurring at precisely timed intervals, equivalent to a similar set of intervals used for sampling the data in the first place. This signal is now additionally being used to produce timing lines through the mechanism of the pulse ratio unit 58 and the flasher 59 or equivalent time generator. Thus, all units still fundamentally rely on one precision timing control, unit 21, for their successful operation.

The use of digital recording can be extended to the field recording of a well log data. This has proved highly desirable in the last few years because of the interest of people receiving this well log data to be able to handle large masses of such information in relatively short form using large-scale computers. However, the systems that have been developed for operation so far have been rather cumbersome and expensive. In FIGURE 14 is shown a block diagram of a well log data recording system based in accordance with our invention. This system can be applied to any type of well logging as long as the data are available in analog electrical form. In this example, it was assumed that four channels of information are to be logged substantially simultaneously. The four channels of well logging data from generators 61 to 64 are passed into a multiplexer 66. This device samples the four channels simultaneously, or in rapid sequence, at the time determined by the closing of the cam switch 65 which is located on the well log cable measuring sheave. This sample command signal is used to start the multiplex operation as obtained from a precision timing control unit 251. Essentially this unit is equivalent to unit 14 except that its precisely controlled timing pulses are initiated in response to an electric signal—in this case, the current resulting from closure of the cam switch 65. Each time the cam switch closes, a precisely related set of timing pulses are emitted by unit 251. The multiplex operation is stopped when all four channels have been fed into the sample and hold unit 13 and AD converter 31, the description of which has already been given in connection with FIGURE 5. The entire sampling step is repeated upon command of the sample pulse. The rate of multiplexing is controlled by an internal precision timing source in the timing control 251. This rate is set so that all four channels can be multiplexed at the highest logging speed desired. If the well log data occurs at slower speeds than the maximum logging speed, the data from the multiplexer will occur in a group of four samples with a time gap until the next data group are produced.

The output of the multiplexer unit 66 is passed to the sample and hold unit 13 and AD converter 31 which converts the data to digital form. If, as is frequently desired, the minimum amount of tape channels are to be used, the multichannel output of unit 31 is fed into a parallel to series converter unit 67 which samples the multichannel digital data in sequence to form a single sequential digital channel output. The parallel to serial converter 67 can be a shift register. The use of a shift register for parallel to serial conversion is described in "Application Note 5.7, Shift Register," Engineering Electronics Company, 1441 Chestnut Ave., Santa Ana, Calif. This data is fed into a recorder head 68 contacting tape 71 of a two-channel magnetic recorder unit 69, or equivalent. At the same time, the timing pulse from timing control 251 is similarly recorded on recording head 70. The sampling of the well data, and thus the digital information representing the multiple samples, is controlled by the cam on the well log cable measuring sheave. The use of the timing channel locates the data on the magnetic tape entirely independently of the tape speed. Thus, the accuracy of the data is not dependent on this tape speed. The four-channel well log data can each be sampled, for example 5 times per second, with an accuracy expressed by 3 decimal digits plus algebraic sign, and this may be recorded on a ¼-inch-wide tape on a tape speed nominally 1⅞ inch per second with a very conservative value of tape bit density of under 200 bits per inch. Thus, a 1,200-foot-tape roll would provide equivalent recording for over 2 hours of well logging.

The magnetic recorder 69 may be driven at a constant speed, in which case the digital data may not be uniformly spaced along the tape. As an alternate drive, the pulse signal on channel 250 (which is the same signal used to actuate the multiplexer 66) can be used to step the magnetic tape unit 69 if it is provided with a drive system which steps the tape 71 a specified distance each time a pulse is fed to the drive system. This results in the digital data being recorded on the tape at a uniform spacing. Such recorders are commercially available.

The digitized well log data could be used for many purposes. For example, the reproduction system required for transfer of the data from a tape, such as tape 71 of FIGURE 14, to a computer paper-punched tape suitable for use in preparing well logging cards in digital form is shown in FIGURE 15. The output of the signal reproducing head 72 which is deriving a signal from the moving tape 71 is passed into a digital distributor unit 73. At the same time, the timing pulses from the reproducing head 74 are passed as control timing pulses into the digital distributor 73. By using the timing pulse and the channel identification pulse recorded on the timing channel, the distributor sorts out the digital data of one specified channel from the four channels recorded in sequence on the tape 71. The digital data of the specified channel is passed to the tape coder unit 75. This device converts the data from the digital form to one suitable for driving a tape punch 76 and adds the necessary parity check code. Units of the type of 73, 75, and 76 are well known. The digital distributor is described in the previous reference "Application Note 5.1, Decommutation of Pulse Data" by Engineering Electronics Company, 1441 Chestnut Ave., Santa Ana, Calif., on page 13. Coding circuits are described in the book "Switching Circuits and Logical Design" by Samuel H. Caldwell, John Wiley and Sons, 1958, chapter 10. A typical tape punch is described in "Friden Motorized Tape Punch," Bulletin SP–8590–R3, Friden, Inc., San Leandro, Calif.

The complete tape is run, extracting the desired channel information. The tape punch 76 acting on paper tape 77 through punch 78 impresses upon the paper tape fully coded equivalents to the original data from one channel (for example, generator 61) of the well logging signal information. The tape 71 is now run a second time, extracting the data from a second channel, and so on until all channels have had their information transferred to the paper tape.

The use of digital techniques in this connection has many advantages. It makes possible the direct entry of well log data into digital computers. The accuracy can be maintained throughout the recording process, since it is controlled by a precision timing control (unit 251). These data can be recorded in a manner having a wide dynamic range without the use of automatic gain controls or of step gain controls.

It is apparent that many adaptations and variations of the recording system that has been described may be made without departing from the spirit of the invention.

Basically the system described in the various analog-digital-analog systems have the same correction system. First, the analog data is digitized at precise time intervals and recorded on a reproducible recording medium such as magnetic tape. The recorder does not necessarily have precise speed control of the tape. The samples will be digitized at precise intervals but the digital data will not occur necessarily at equal intervals on the tape.

Secondly, the derived digital material from a tape, when reproduced on a system which does not have precise speed control in either record or playback, is loaded into a core storage as it comes from the tape. This digital data is unloaded from the core storage at precise time intervals. Accordingly, the generation of the output signals converted from DA form is accomplished using the same pulse time sequence and the same timing precision as was true on the original handling of the data.

Third, after the original sets of digital data have been produced in direct proportion to the varying amplitude of the original signal, these sets may be processed before or after the temporary recording is made to filter the data, or to enhance the signal-to-noise ratio in other ways. Then the resulting derived digital material can be converted into equivalent electrical signals, each directly related to the amplitude at a particular time of the original signal (though the relationship, through the data processing, is no longer a fixed ratio).

Numerous other advantages inherent to this system will be apparent to those skilled in this art. Accordingly, the invention is best defined by the scope of the appended claims.

We claim:

1. Apparatus for accurately recording in digital form the output signals from a plurality of channels of input electrical signals of varying amplitude comprising,
   (A) a timing unit (a) capable of delivering at precise, predetermined time intervals a set of actuating pulses,
   (B) a first digital multiplexer unit (b) the multiple inputs of which are connected individually to the said plurality of input signals,
   (C) a multichannel attenuator (c),
   (D) a second digital multiplexer unit (d) the multiple inputs of which are connected individually through said attenuator (c) to the said plurality of input signals in parallel with the inputs of said first multiplexer unit (b), both of said multiplexer units responsive to pulses from said timing unit (a),
   (E) a sample and hold unit (e) adapted to periodically sample the output signal of the multiplex unit to which it is connected and to hold said signal sample temporarily, said sample and hold unit responsive to pulses from said timing unit (a),
   (F) a multiplex control unit (f) connected to both of said multiplex units (b) and (d), to switch the outputs of one or the other of said multiplex units (b) and (d) to said sample and hold circuit (e), said control unit (f) responsive to pulses from said timing unit (a),
   (G) an analog-to-digital converter (g) connected at its input to the output of said sample and hold unit (e), and responsive to pulses from said timing unit (a) to generate the digital equivalent of each sample from unit (e), and
   (H) a recorder means (h) capable of producing reproducible records on a medium and responsive to said converter unit (g).

2. Apparatus in accordance with claim 1 including means responsive to said timing unit (a) to control said multiplex control unit (f) to cause it to switch the output of one or the other of said multiplex units (b) or (d) to said sample and hold unit (e).

3. Apparatus in accordance with claim 1 including means responsive to the amplitude of at least one of said input electrical signals to control said multiplex control unit (f) to cause it to switch the output of one or the other of said multiplex units (b) or (d) to said sample and hold unit (e).

4. Apparatus in accordance with claim 1 including means for placing on said medium a reproducible indication which is unique for each of said plurality of signals.

5. Apparatus for reproducing multiplexed digital signals recorded on a reproducible recording medium and converting them to a plurality of separate electrical signals, comprising
   (A) reproducer means (a) for generating desired digital signals from said recording medium,
   (B) timing means (b) capable of delivering at precise predetermined time intervals a set of actuating pulses,
   (C) digital storage means (c) adapted to reproducibly store said digital signals,
   (D) loading means (d) to receive said digital signals from said means (a) and sequentially place them in said storage means (c), (E) unloading means (e) to withdraw said digital signals sequentially from said storage means in the order in which they were loaded by means (d), said unloading means (e) being responsive to pulses from said timing means (b) to withdraw said digital signals at precise predetermined time intervals, (F) interlock means (f) between said loading means (d) and said unloading means (e) to prevent loading and unloading of said digital signals at the precise same instant, said interlock means including, (G) timing means (g) controlled by pulses from said timing means (b) to provide in each operating cycle both an early unload pulse (h) and a late unload pulse (i), (H) means to provide a load pulse (j) whenever a digital signal is ready to be loaded into said storage means (c), (I) comparison means (k) to compare the timing of pulse (j) with said early unload pulse (h) to determine if they are coincident, (J) control means (m) responsive to said comparison means (k) to control the passage to said storage means (c) of only one of said early unload pulse (h) and said late unload pulse (i), (K) digital distributor means (n) connected at its input to said storage means (c) and having a plurality of outputs, said distributor means (n) responsive to pulses from said timing means (b) to separate the multiplexed signals pertaining to said plurality of signals into plural signal trains each corresponding to one of said plurality of signals, and (L) a plurality of digital-to-analog converters (o) one in each output lead of said distributor means (n), said converters responsive to pulses from said timing means (b).

6. Apparatus for producing a varying amplitude analog signal directly related to a series of sets of digital data comprising (A) timing means (a) for generating at precise predetermined intervals a set of control pulses, (B) digital storage means (b) adapted to reproducibly store said digital data, (C) data loading means (c) adapted to receive said sets of digital data sequentially at approximately the intervals of said timing means (a), (D) data unloading means (d) to withdraw said sets of digital data from said storage means (b) sequentially in the other in which they were loaded by means (c) responsive to said control pulses from said timing means (a), (E) interlock means between said loading and unloading means to prevent loading and unloading at the same instant, said interlock means including, (F) timing means (e) controlled by pulses from said timing means (a) to provide in each operating cycle both an early unload pulse (f) and a late unload pulse (g), (G) means to provide a load pulse (h) whenever a digital signal is ready to be loaded into said storage means (b), (H) comparison means (i) to compare the timing of load pulse (h) with said early unload pulse (f) to determine if they are coincident, (I) control means (j) responsive to said comparison means (i) to control the passage of one of said early unload pulse (f) and said late unload pulse (g) to said storage means (b), and (J) digital-to-analog converter means connected to the output of said storage means and responsive to said timing means to convert said sets of digital data to contiguous segments of a stepped analog signal.

7. Apparatus in accordance with claim 6 including recording means for receiving and recording said stepped analog signal on a recording medium and means for placing on said recording medium an indication which is unique for said stepped analog signal.

8. In a temporary digital storage system into which, simultaneously, digital signals are loaded in a given sequence and from which digital signals are unloaded in the same sequence, the times of loading being uncontrollable, the cycle of unloading being controlled by a first timing means capable of delivering at precise predetermined time intervals a set of actuating pulses, the improvement for preventing the loading and unloading of said signals at the same instant of time, comprising, (A) second timing means responsive to said timing means to provide in each unloading cycle an early unload pulse and a late unload pulse, (B) means to provide a load pulse whenever a digital signal is ready to be loaded into said digital storage system, and (C) control means to permit unloading of said storage system at the times of either of said early unload pulse or said late unload pulse which is not coincident in time with said load pulse.

References Cited

UNITED STATES PATENTS

| 2,907,004 | 9/1959 | Chien et al. | 340—172.5 |
|---|---|---|---|
| 2,993,195 | 7/1961 | Groce | 340—172.5 |
| 3,051,787 | 8/1962 | Parks | 340—172.5 |
| 3,119,992 | 1/1964 | Fluegel | 340—172.5 |
| 3,131,377 | 4/1964 | Grondin | 340—172.5 |
| 3,134,957 | 5/1964 | Foote et al. | 340—347 |
| 3,145,374 | 8/1964 | Benner et al. | 340—203 |
| 3,197,759 | 7/1965 | Klein et al. | 340—347 |
| 3,222,670 | 12/1965 | Harel | 340—347 |

OTHER REFERENCES

Klein, M. L., et al.: Automatic Data Reduction, in Instruments and Automation, 29 (9): pp. 1767–1772, September 1956.

Skov, R. A., et al.: Buffer System, in IBM Technical Disclosure Bulletin, 2 (5): pp. 86–89, February 1960.

ROBERT C. BAILEY, *Primary Examiner.*

J. P. VANDENBURG, *Assistant Examiner.*